US012747100B2

(12) United States Patent
Heggebø et al.

(10) Patent No.: US 12,747,100 B2
(45) Date of Patent: Sep. 29, 2026

(54) STORAGE COLUMN MODULE FOR COUPLING TO A FRAMEWORK STRUCTURE OF AN AUTOMATED STORAGE AND RETRIEVAL SYSTEM

(71) Applicant: Autostore Technology AS, Nedre Vats (NO)

(72) Inventors: Jørgen Djuve Heggebø, Langhus (NO); Øystein Gjerdevik, Skjold (NO)

(73) Assignee: AutoStore Technology AS, Nedre Vats (NO)

( * ) Notice: Subject to any disclaimer, the term of this patent is extended or adjusted under 35 U.S.C. 154(b) by 376 days.

(21) Appl. No.: 18/557,473

(22) PCT Filed: May 12, 2022

(86) PCT No.: PCT/EP2022/062909
§ 371 (c)(1),
(2) Date: Oct. 26, 2023

(87) PCT Pub. No.: WO2022/243153
PCT Pub. Date: Nov. 24, 2022

(65) Prior Publication Data

US 2024/0217741 A1 Jul. 4, 2024

(30) Foreign Application Priority Data

May 21, 2021 (NO) .................................... 20210629
May 28, 2021 (NO) .................................... 20210679
Aug. 16, 2021 (NO) .................................... 20210979

(51) Int. Cl.
*B65G 1/04* (2006.01)
*B65G 1/10* (2006.01)

(52) U.S. Cl.
CPC ............. *B65G 1/0464* (2013.01); *B65G 1/10* (2013.01); *B65G 2201/0258* (2013.01)

(58) Field of Classification Search
CPC ................................ B65G 1/0464; B65G 1/10
See application file for complete search history.

(56) References Cited

U.S. PATENT DOCUMENTS 4,088,232 A * 5/1978 Lilly .................... B65G 1/0464 414/282
4,568,233 A 2/1986 Baker et al.

(Continued)

FOREIGN PATENT DOCUMENTS

CN 101554959 A 10/2009
CN 203998139 U 12/2014

(Continued)

OTHER PUBLICATIONS

International Search Report issued in corresponding International Application No. PCT/EP2022/062909, mailed on Sep. 14, 2022 (6 pages).

(Continued)

*Primary Examiner* — James Keenan
(74) *Attorney, Agent, or Firm* — Baker Botts L.L.P.

(57) ABSTRACT

An automated storage and retrieval system includes a framework structure that includes a plurality of storage columns for accommodating goods holders. A rail system is arranged across the top of the framework structure. The automated storage and retrieval system further includes a detachable storage column module for coupling to the framework structure of the system. The module includes at least one storage column for accommodating goods holders inserted by means of a remotely operated vehicle operating on the rail system. The at least one storage column includes a plurality of storage cells each comprising a goods holder support movable between a first position in which the support can obstruct passage of the goods holder moving vertically through the storage cell and a second position in (Continued)

which the vertically moving goods holder can pass through the storage cell.

20 Claims, 11 Drawing Sheets

(56) References Cited

U.S. PATENT DOCUMENTS

| | | | | |
|---|---|---|---|---|
| 4,923,354 | A | 5/1990 | Giuliano et al. | |
| 5,156,514 | A | 10/1992 | Zah | |
| 10,336,540 | B2 * | 7/2019 | Gravelle | B65G 1/04 |
| 2003/0228208 | A1 | 12/2003 | Grond | |
| 2007/0297879 | A1 | 12/2007 | Yuyama et al. | |
| 2015/0127143 | A1 | 5/2015 | Lindbo et al. | |
| 2018/0044111 | A1 | 2/2018 | Clarke et al. | |
| 2018/0150793 | A1 | 5/2018 | Lert, Jr. et al. | |
| 2019/0092567 | A1 | 3/2019 | Lawrence et al. | |
| 2019/0225436 | A1 | 7/2019 | Lindbo et al. | |
| 2019/0246571 | A1 | 8/2019 | Ingram-Tedd et al. | |
| 2020/0148470 | A1 | 5/2020 | Austrheim | |
| 2021/0052070 | A1 | 2/2021 | Cavelius et al. | |

FOREIGN PATENT DOCUMENTS

| | | | |
|---|---|---|---|
| CN | 109987371 | A | 7/2019 |
| CN | 110612259 | A | 12/2019 |
| CN | 110949918 | A | 4/2020 |
| CN | 211225007 | U | 8/2020 |
| CN | 211495516 | U | 9/2020 |
| DE | 102009017241 | A1 | 10/2010 |
| EP | 1 775 241 | A1 | 4/2007 |
| GB | 1296443 | A | 11/1972 |
| JP | S52-9271 | A | 1/1977 |
| JP | H05-201544 | A | 8/1993 |
| JP | 2002096916 | A | 4/2002 |
| NO | 317366 | B1 | 10/2004 |
| WO | 2007/016057 | A2 | 2/2007 |
| WO | 2014/075937 | A1 | 5/2014 |
| WO | 2014/090684 | A1 | 6/2014 |
| WO | 2014/195901 | A1 | 12/2014 |
| WO | 2015/193278 | A1 | 12/2015 |
| WO | 2016/166294 | A1 | 10/2016 |
| WO | 2018/146304 | A1 | 8/2018 |
| WO | 2019/206487 | A1 | 10/2019 |
| WO | 2019/238639 | A1 | 12/2019 |
| WO | 2019/243549 | A1 | 12/2019 |

OTHER PUBLICATIONS

Written Opinion issued in corresponding International Application No. PCT/EP2022/062909, mailed on Sep. 14, 2022 (13 pages).
Search Report issued in counterpart Norwegian Patent Application No. 20210629 mailed on Dec. 21, 2021 (2 pages).
Search Report issued in counterpart Norwegian Patent Application No. 20210679 mailed on Dec. 23, 2021 (3 pages).
Search Report issued in counterpart Norwegian Patent Application No. 20210979 mailed on Mar. 11, 2022 (2 pages).
Replaced Written Opinion issued in corresponding International Application No. PCT/EP2022/062909, mailed on Oct. 7, 2022 (9 pages).
Meng, Xiangyi, Office Action in CN202280033321.4, mailed Jul. 31, 2025, 30 pages, The State Intellectual Property Office of the People's Republic of China, Beijing, China.
Meng, Xiangyi, Office Action in CN202280033321.4, mailed Mar. 25, 2026, 23 pages, The State Intellectual Property Office of the People's Republic of China, Beijing, China.

* cited by examiner

Fig. 9e
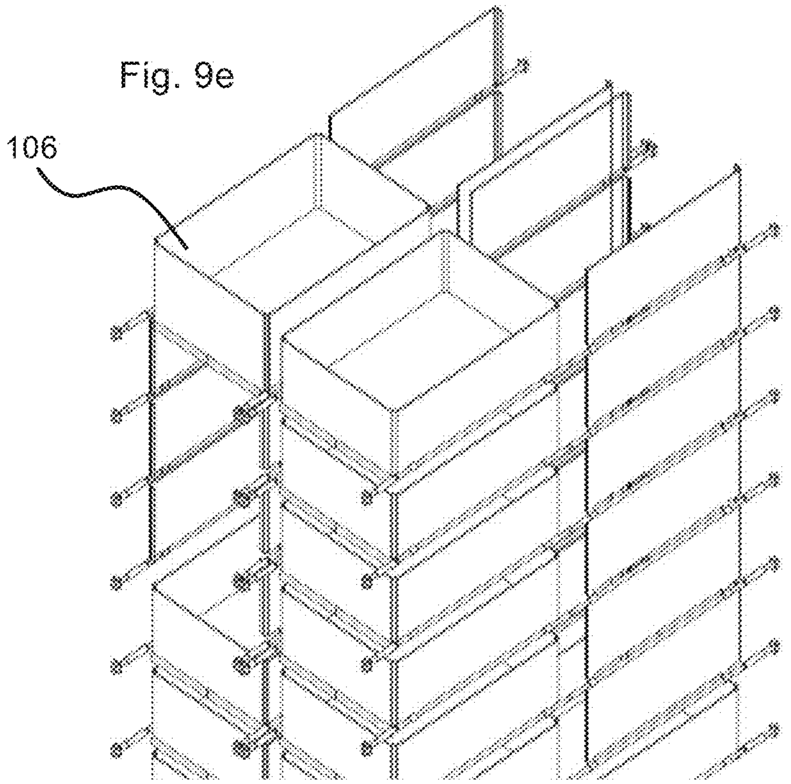
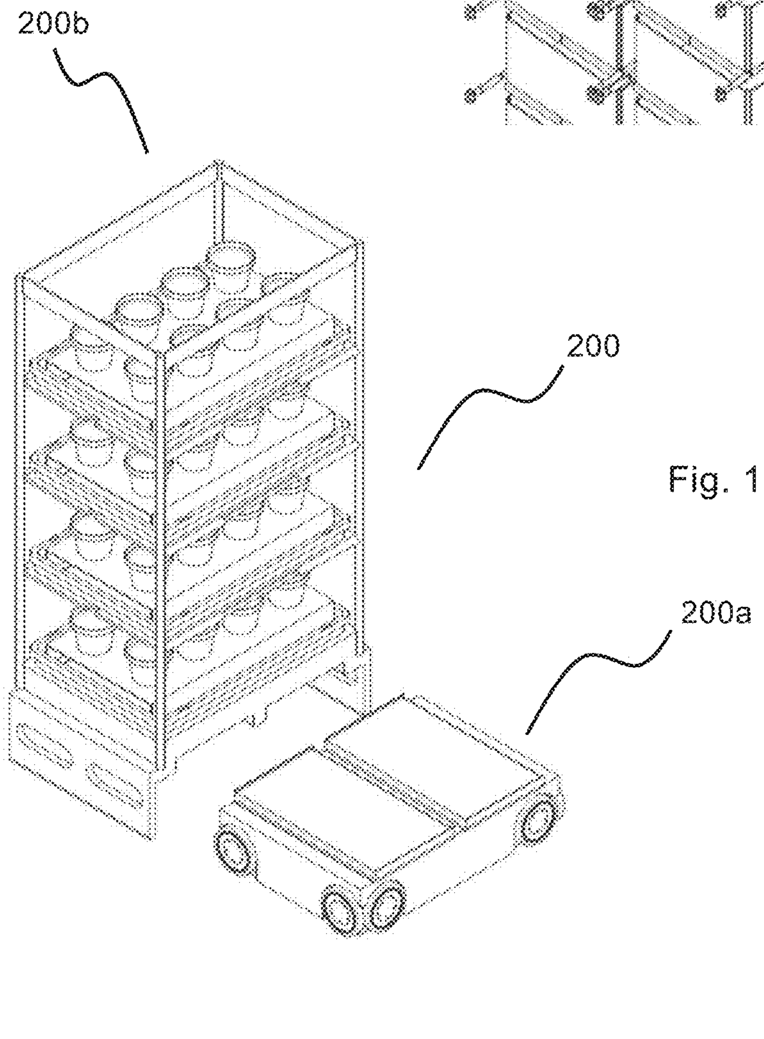
Fig. 12

STORAGE COLUMN MODULE FOR COUPLING TO A FRAMEWORK STRUCTURE OF AN AUTOMATED STORAGE AND RETRIEVAL SYSTEM

The present invention relates to a storage column module for coupling to a framework structure of an automated storage and retrieval system. The invention further relates to an automated storage and retrieval system comprising a storage column module.

BACKGROUND AND PRIOR ART

FIG. 1 discloses a prior art automated storage and retrieval system 1 with a framework structure 100 and FIGS. 2, 3*a*-3*b* disclose three different prior art container handling vehicles 201, 301, 401 suitable for operating on such a system 1.

The framework structure 100 comprises upright members 102 and a storage volume comprising storage columns 105 arranged in rows between the upright members 102. In these storage columns 105 storage containers 106, also known as bins, are stacked one on top of one another to form container stacks 107. The members 102 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 301, 401 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 301, 401 in a first direction X across the top of the frame structure 100, and a second set of parallel rails 111 arranged perpendicular to the first set of rails 110 to guide movement of the container handling vehicles 301, 401 in a second direction Y which is perpendicular to the first direction X. Containers 106 stored in the columns 105 are accessed by the container handling vehicles 301, 401 through access openings 112 in the rail system 108. The container handling vehicles 301, 401 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201, 301, 401 comprises a vehicle body 201*a*, 301*a*, 401*a* and first and second sets of wheels 201*b*, 201*c*, 301*b*, 301*c*, 401*b*, 401*c* which enable lateral movement of the container handling vehicles 201, 301, 401 in the X direction and in the Y direction, respectively. In FIGS. 2-3*b*, two wheels in each set are fully visible. The first set of wheels 201*b*, 301*b*, 401*b* is arranged to engage with two adjacent rails of the first set 110 of rails, and the second set of wheels 201*c*, 301*c*, 401*c* is arranged to engage with two adjacent rails of the second set 111 of rails. At least one of the sets of wheels 201*b*, 201*c*, 301*b*, 301*c*, 401*b*, 401*c* can be lifted and lowered, so that the first set of wheels 201*b*, 301*b*, 401*b* and/or the second set of wheels 201*c*, 301*c*, 401*c* can be engaged with the respective set of rails 110, 111 at any one time.

Each prior art container handling vehicle 201, 301, 401 also comprises a lifting device 304, 404 (visible in FIGS. 3*a*-3*b*) having a lifting frame part 304*a*, 404*a* for vertical transportation of storage containers 106, e.g. raising a storage container 106 from, and lowering a storage container 106 into, a storage column 105. The lifting device 304, 404 comprises one or more gripping/engaging devices which are adapted to engage a storage container 106, and which gripping/engaging devices can be lowered from the vehicle 201, 301, 401 so that the position of the gripping/engaging devices with respect to the vehicle 201, 301, 401 can be adjusted in a third direction Z (visible for instance in FIG. 1) which is orthogonal the first direction X and the second direction Y. Parts of the gripping device of the container handling vehicles 301, 401 are shown in FIGS. 3*a* and 3*b* indicated with reference number. The gripping device of the container handling device 201 is located within the vehicle body 201*a* in FIG. 2.

Conventionally, and also for the purpose of this application, Z=1 identifies the uppermost layer available for storage containers below the rails 110, 111, i.e. the layer immediately below the rail system 108. Z=2 the second layer below the rail system 108, Z=3 the third layer etc. In the exemplary prior art disclosed in FIG. 1. Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=18, Y=1, Z=6. The container handling vehicles 201, 301, 401 can be said to travel in layer Z=0, and each storage column 105 can be identified by its X and Y coordinates. Thus, the storage containers shown in FIG. 1 extending above the rail system 108 are also said to be arranged in layer Z=0.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201, 301, 401 comprises a storage compartment or space for receiving and stowing a storage container 106 when transporting the storage container 106 across the rail system 108. The storage space may comprise a cavity arranged internally within the vehicle body 201*a* as shown in FIGS. 2 and 3*b* and as described in e.g. WO2015/193278A1 and WO2019/206487A1, the contents of which are incorporated herein by reference.

FIG. 3*a* shows an alternative configuration of a container handling vehicle 301 with a cantilever construction. Such a vehicle is described in detail in e.g. NO3 17366, the contents of which are also incorporated herein by reference.

The cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the cavity container handling vehicles 401 may have a footprint which is larger than the lateral area defined by a storage column 105 as shown in FIG. 3*b* and as disclosed in WO2014/090684A1 or WO2019/206487A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks; in other rail systems 108, each rail in one direction may comprise one track and each rail in the other perpendicular direction may comprise two tracks. The rail system may also comprise a double track rail in one of the X or Y direction and a single track rail in the other of the X or Y direction. A double track rail may comprise two rail members, each with a track, which are fastened together.

WO2018/146304A1, the contents of which are incorporated herein by reference, illustrates a typical configuration of rail system 108 comprising rails and parallel tracks in both X and Y directions.

In the framework structure 100, a majority of the columns 105 are storage columns 105. i.e. columns 105 where storage containers 106 are stored in stacks 107. However, some columns 105 may have other purposes. In FIG. 1, columns 119 and 120 are such special-purpose columns used by the container handling vehicles 201, 301, 401 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or a dedicated column 105 within the framework structure 100, then picked up by any container handling vehicle and transported to a port column 119, 120 for further transportation to an access station. The transportation from the port to the access station may require movement along various different directions, by means such as delivery vehicles, trolleys or other transportation lines. Note that the term 'tilted' means transportation of storage containers 106 having a general transportation orientation somewhere between horizontal and vertical.

In FIG. 1, the first port column 119 may for example be a dedicated drop-off port column where the container handling vehicles 201, 301 can drop off storage containers 106 to be transported to an access or a transfer station, and the second port column 120 may be a dedicated pick-up port column where the container handling vehicles 201, 301, 401 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are, once accessed, returned into the framework structure 100. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119, 120 and the access station.

If the port columns 119, 120 and the access station are located at different heights, the conveyor system may comprise a lift device with a vertical component for transporting the storage containers 106 vertically between the port column 119, 120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201, 301, 401 is instructed to retrieve the target storage container 106 from its position and transport it to the drop-off port column 119. This operation involves moving the container handling vehicle 201, 301 to a location above the storage column 105 in which the target storage container 106 is positioned, retrieving the storage container 106 from the storage column 105 using the container handling vehicle's 201, 301, 401 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201, 301, 401 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201, 301, 401 is instructed to pick up the storage container 106 from the pick-up port column 120 and transport it to a location above the storage column 105 where it is to be stored. After storage containers 106 positioned at or above the target position within the stack 107 have been removed, the container handling vehicle 201, 301, 401 positions the storage container 106 at the desired position. The removed storage containers 106 may then be lowered back into the storage column 105 or relocated to other storage columns 105.

For monitoring and controlling the automated storage and retrieval system 1, e.g. monitoring and controlling the location of respective storage containers 106 within the framework structure 100, the content of each storage container 106 and the movement of the container handling vehicles 201, 301, 401 so that a desired storage container 106 can be delivered to the desired location at the desired time without the container handling vehicles 201, 301, 401 colliding with each other, the automated storage and retrieval system 1 comprises a control system 500 (shown in FIG. 1) which typically is computerized and which typically comprises a database for keeping track of the storage containers 106.

WO14195901 discloses a system for stacking containers in an automated storage and retrieval system comprising a delivery port where an ordered container can be transported to. The container can be lowered to or placed on a conveyance for delivery to an order picking station at the port. The system can include one or more clamps, each clamp corresponding to a stack location and being configured for clamping one or more of the lowest containers in a stack. One or more lifters is configured for lifting one or more containers into position suitable for engagement by the clamp(s) and at least one overhead load handler is configured for lifting one or more containers from a top of the stack and for lowering one or more containers onto the top of the stack.

WO2016/166294 discloses an object handling system having certain similarities with the system shown in FIG. 1. The system comprises a workspace with several vertically extending storage spaces, each comprising a plurality of stacked storage containers. The system further comprises wheeled robotic load handling devices operating on rails arranged in a grid pattern above the workspace. The robotic devices can move in a horizontal direction and, when suitably positioned relative a selected storage space, i.e. immediately above a stack of containers, use lifting means to engage and lift a top container from the stack such that the engaged container is removed from the work-space. A corresponding operation is performed in the opposite scenario, i.e. when a storage container needs to be introduced into a selected storage space of the workspace. In WO2016/166294, a number of vertically extending storage spaces is independently separable with respect to the remaining storage spaces of the workspace. The separated storage spaces are subsequently transported to an alternative location by means of a suitable vehicle. Once arrived at the destination, if the stacked storage containers of a certain storage space are to be unloaded, then a rail-mounted load handling device operating in the above-described manner typically needs to be employed. In certain cases, such a conventional unloading solution cannot be implemented due to prohibitively high investment cost.

In view of the above, it is desirable to provide a solution that solves or at least mitigates one or more of the aforementioned problems belonging to the prior art.

SUMMARY OF THE INVENTION

The present invention is set forth and characterized in the independent claim, while the dependent claims describe other characteristics of the invention.

First aspect of the invention relates to a storage column module for coupling to a framework structure of an automated storage and retrieval system, said module comprising at least one storage column for accommodating goods holders inserted by means of a remotely operated vehicle operating on a rail system arranged across the top of the framework structure, the at least one storage column comprising a plurality of storage cells each comprising a goods holder support movable between a first position in which said support can obstruct passage of the goods holder moving vertically through the storage cell and a second position in which the vertically moving goods holder can pass through the storage cell.

By providing a storage column module in accordance with the first aspect of the invention, i.e. having a movable goods holder support, it is possible to load/unload the holder in a standard manner, i.e. by means of a remotely operated vehicle positioned on top of the of the framework structure of the system. The requirement is then for the support to be in a second position, allowing the vertically moving storage container to freely traverse the empty storage cell. In a related context, the customary stacking of goods holders, i.e. superposing holders so that a given goods holder is in physical contact with both vertically adjacent holders, may be dispensed with. This is achieved when the movable goods holder support are positioned in a first position in which the support may hold and support the goods holder. In this context, a further advantage conferred by the invention is that digging for goods holders, for instance for those goods holders that require high frequency access and/or in the context of part-consolidated orders, may be dispensed with.

In addition and by virtue of the invention, the degree of alignment of goods holders, when positioned in the storage column, critical in the context of a conventional stack of holders, becomes irrelevant.

Second aspect of the invention relates to an automated storage and retrieval system comprising a framework structure that comprises a plurality of storage columns for accommodating goods holders, wherein a rail system is arranged across the top of the framework structure, the automated storage and retrieval system further comprising a storage column module for coupling to the framework structure of the system, said module comprising at least one storage column for accommodating goods holders inserted by means of a remotely operated vehicle operating on the rail system. For the sake of brevity, advantages discussed above in connection with the detachable module may even be associated with the automated storage and retrieval system and are not further discussed.

For the purposes of this application, the term "container handling vehicle" used in "Background and Prior Art"-section of the application and the term "remotely operated vehicle" used in "Detailed Description of the Invention"-section both define an autonomous wheeled vehicle operating on a rail system arranged across the top of the framework structure being part of an automated storage and retrieval system.

Analogously, the term "storage container" used in "Background and Prior Art"-section of the application and the term "goods holder" used in "Detailed Description of the Invention"-section both define a receptacle for storing items. In this context, the goods holder can be a bin, a tote, a pallet, a tray or similar. Different types of goods holders may be used in the same automated storage and retrieval system.

The relative terms "upper", "lower", "below", "above", "higher" etc. shall be understood in their normal sense and as seen in a Cartesian coordinate system. When mentioned in relation to a rail system, "upper" or "above" shall be understood as a position closer to the surface rail system (relative to another component), contrary to the terms "lower" or "below" which shall be understood as a position further away from the rail system (relative another component).

BRIEF DESCRIPTION OF THE DRAWINGS

Following drawings are appended to facilitate the understanding of the invention. The drawings show embodiments of the invention, which will now be described by way of example only, where:

FIGS. 9*a*-9*e* show a sequence featuring coupling of a detachable storage module to a framework structure of an automated storage and retrieval system as well as pivoting motion of a goods holder support.

FIG. 12 shows a self-propelled storage column module according to an embodiment of the present invention.

DETAILED DESCRIPTION OF THE INVENTION

Figure 1:
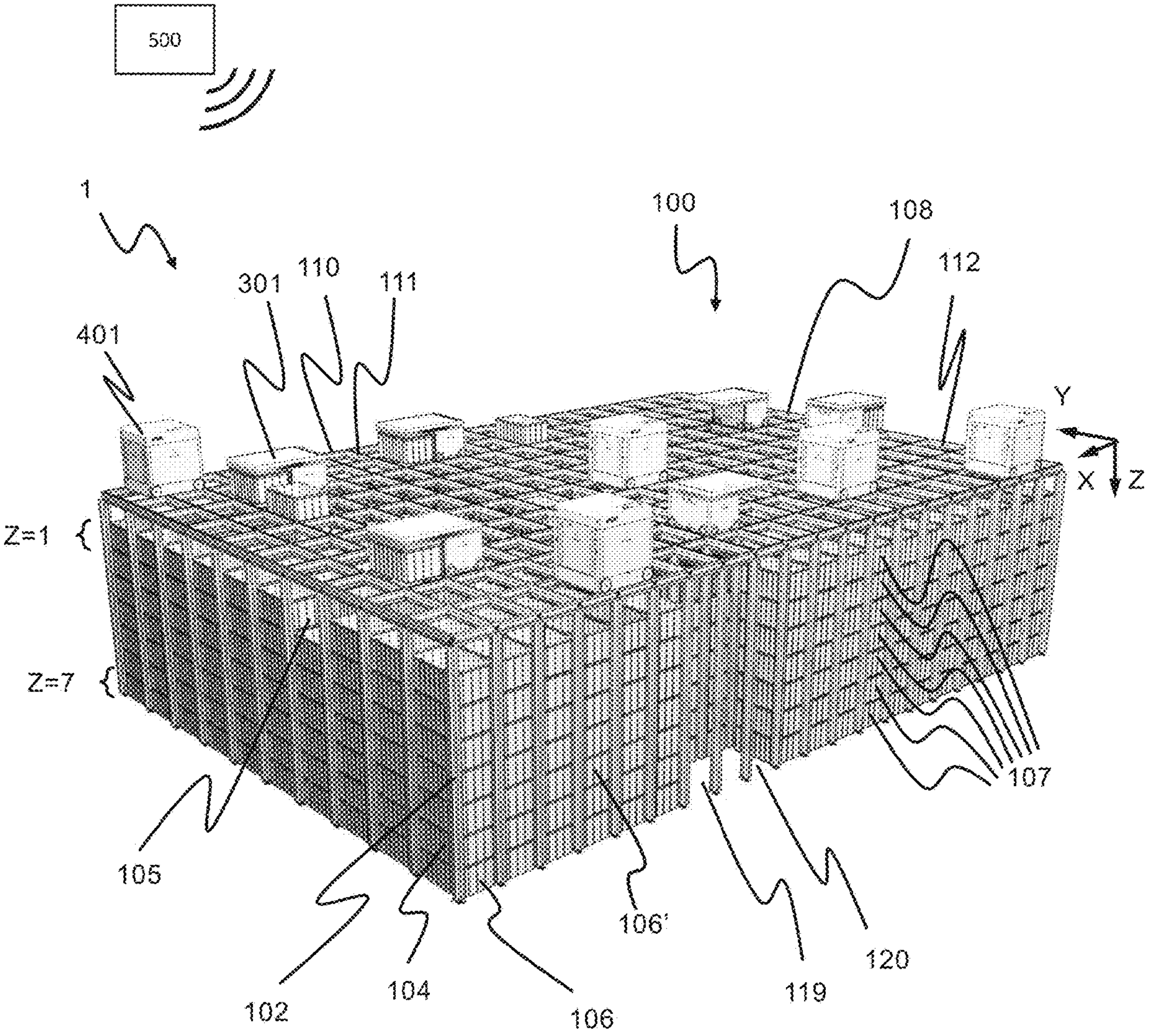
Fig. 1 (Prior Art)
FIG. 1 is a perspective view of a framework structure of a prior art automated storage and retrieval system.
Figure 2:
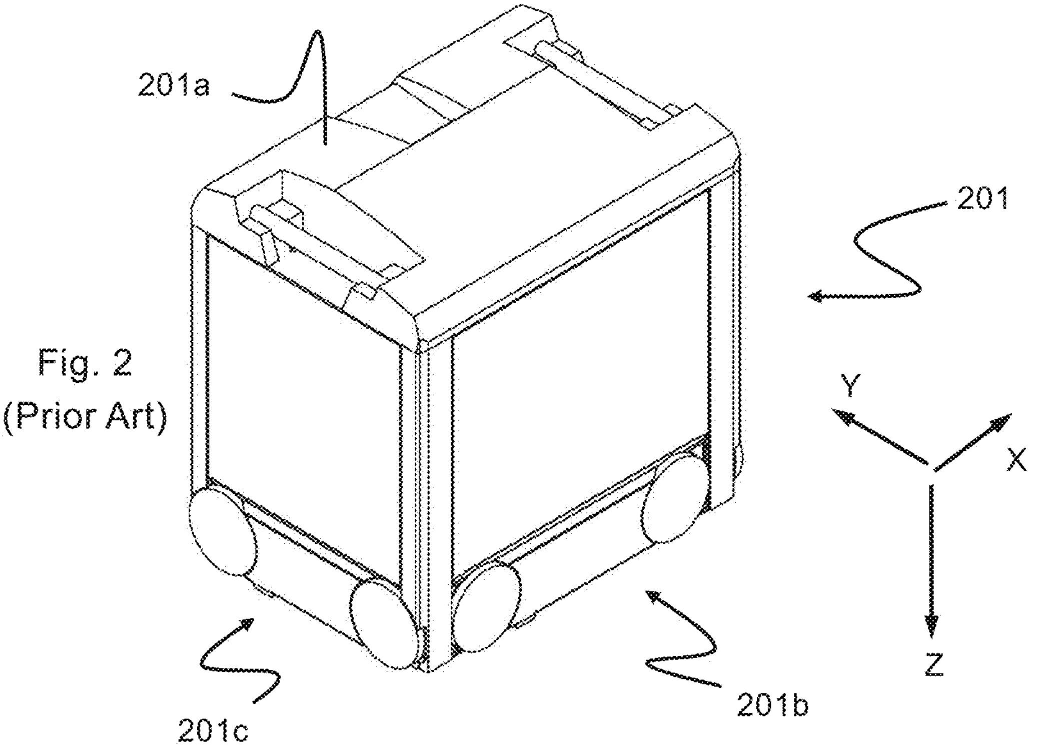
Fig. 2 (Prior Art)
FIG. 2 is a perspective view of a prior art container handling vehicle having a centrally arranged cavity for carrying storage containers therein.
Figure 3A:
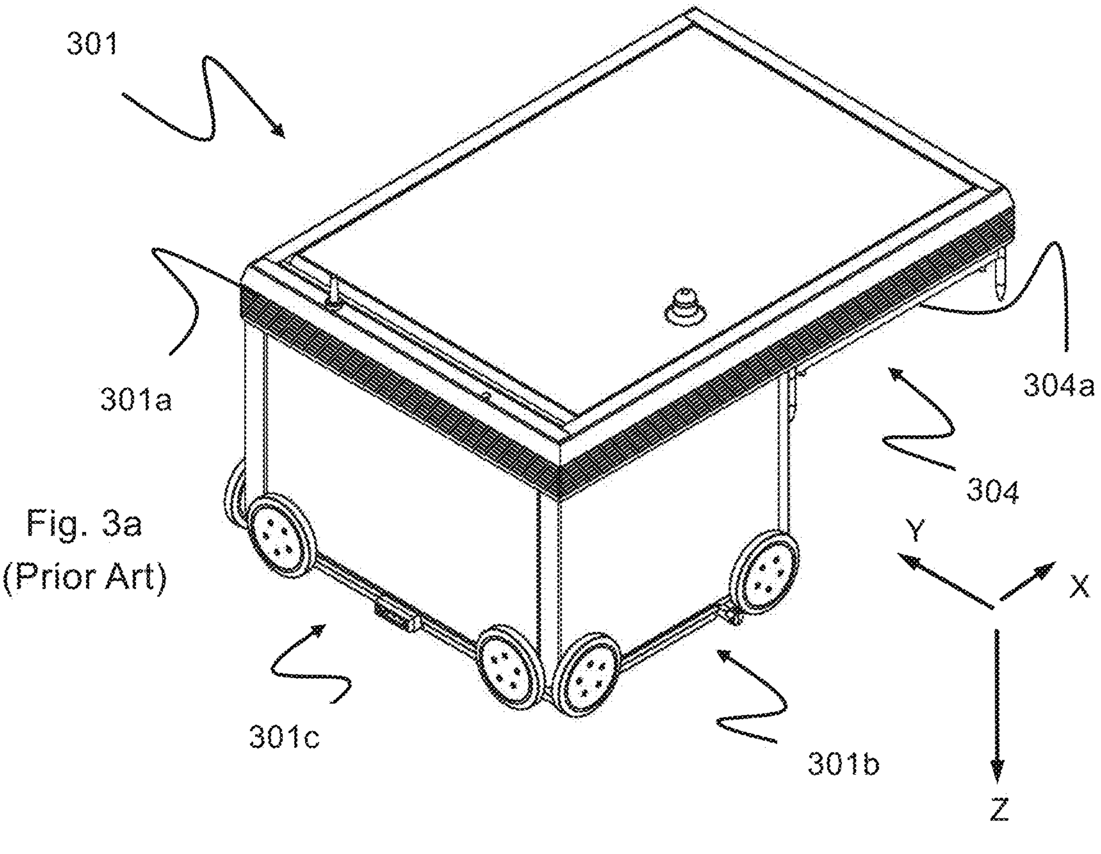
Fig. 3a (Prior Art)
FIG. 3*a* is a perspective view of a prior art container handling vehicle having a cantilever for carrying storage containers underneath.
Figure 3B:
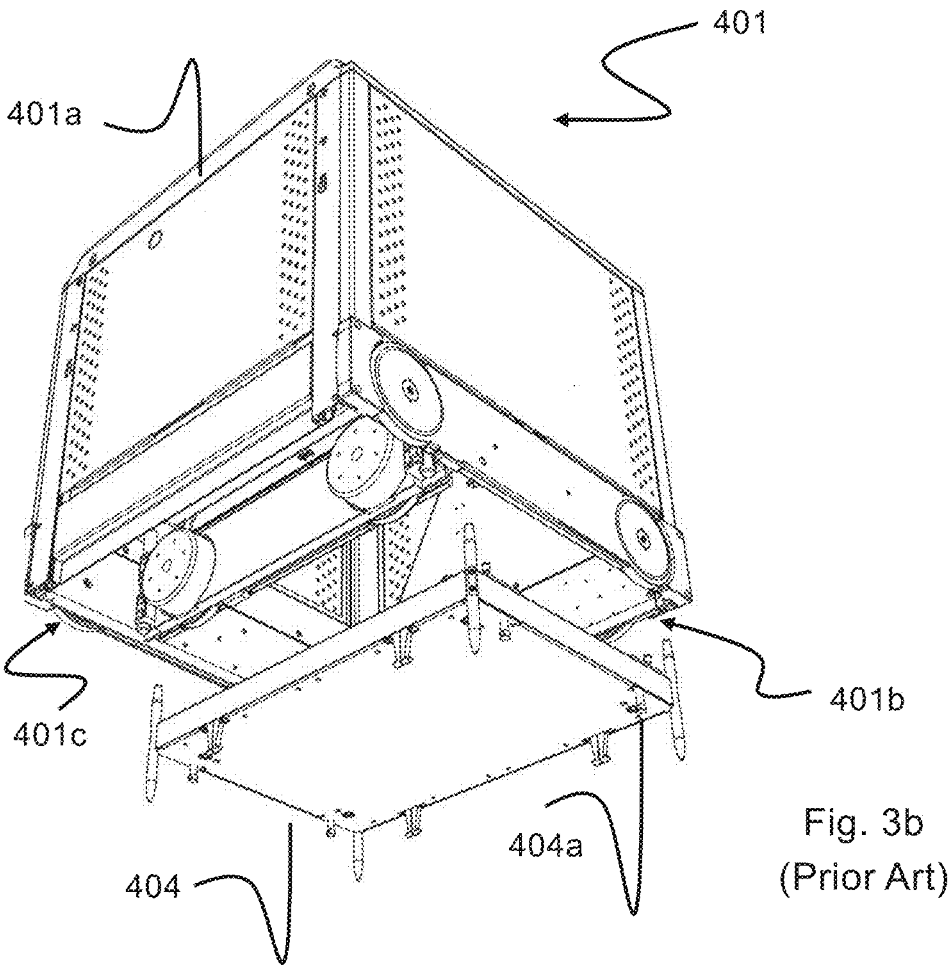
Fig. 3b (Prior Art)
FIG. 3*b* is a perspective view, seen from below, of a prior art container handling vehicle having an internally arranged cavity for carrying storage containers therein.

In the following, embodiments of the invention will be discussed in more detail with reference to the appended drawings. It should be understood, however, that the drawings are not intended to limit the invention to the subject-matter depicted in the drawings.

The framework structure 100 of the automated storage and retrieval system 1 is constructed in accordance with the prior art framework structure 100 described above in connection with FIGS. 1-3*b*, i.e. a number of upright members 102, wherein the framework structure 100 also comprises a first, upper rail system 108 in the X-direction and Y-direction.

The framework structure 100 further comprises storage compartments in the form of storage columns 105 provided between the members 102 where storage containers 106 are stackable in stacks 107 within the storage columns 105.

The framework structure 100 can be of any size. In particular, it is understood that the framework structure can be considerably wider and/or longer and/or deeper than what is disclosed in FIG. 1. For example, the framework structure 100 may have a horizontal extent of more than 700×700 columns and a storage depth of more than twelve containers.

Various aspects of the present invention will now be discussed in more detail with reference to FIGS. 4*a*-12.

Figure 4A:
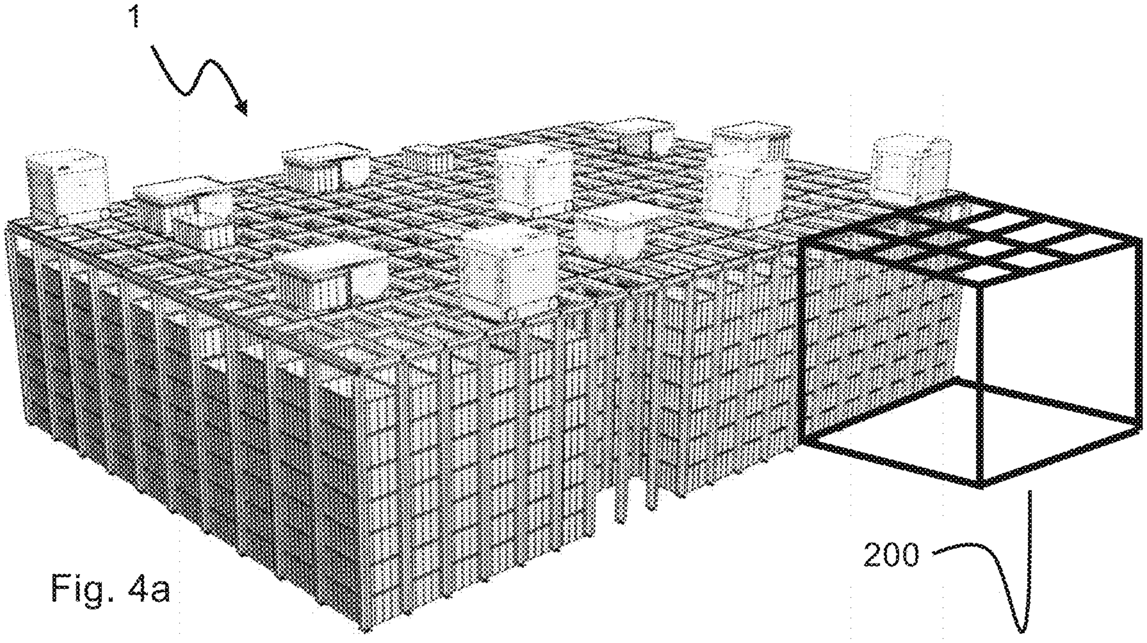
FIG. 4*a* shows an example of an automated storage and retrieval system comprising a storage column module according to an embodiment of the present invention.

FIG. 4*a* shows an example of an automated storage and retrieval system 1 comprising a schematically drawn storage column module 200 according to an embodiment of the present invention. As discussed above, the automated storage and retrieval system 1 comprises a framework structure that comprises a plurality of storage columns for accommodating goods holders, wherein a rail system is arranged across the top of the framework structure 100. The automated storage and retrieval system 1 further comprises the storage column module 200 for coupling to the framework structure of the system 1. The detachable module 200 is arranged external to the system 1. The module 200 will be discussed in greater detail in conjunction with FIG. 5.

Figure 4B:
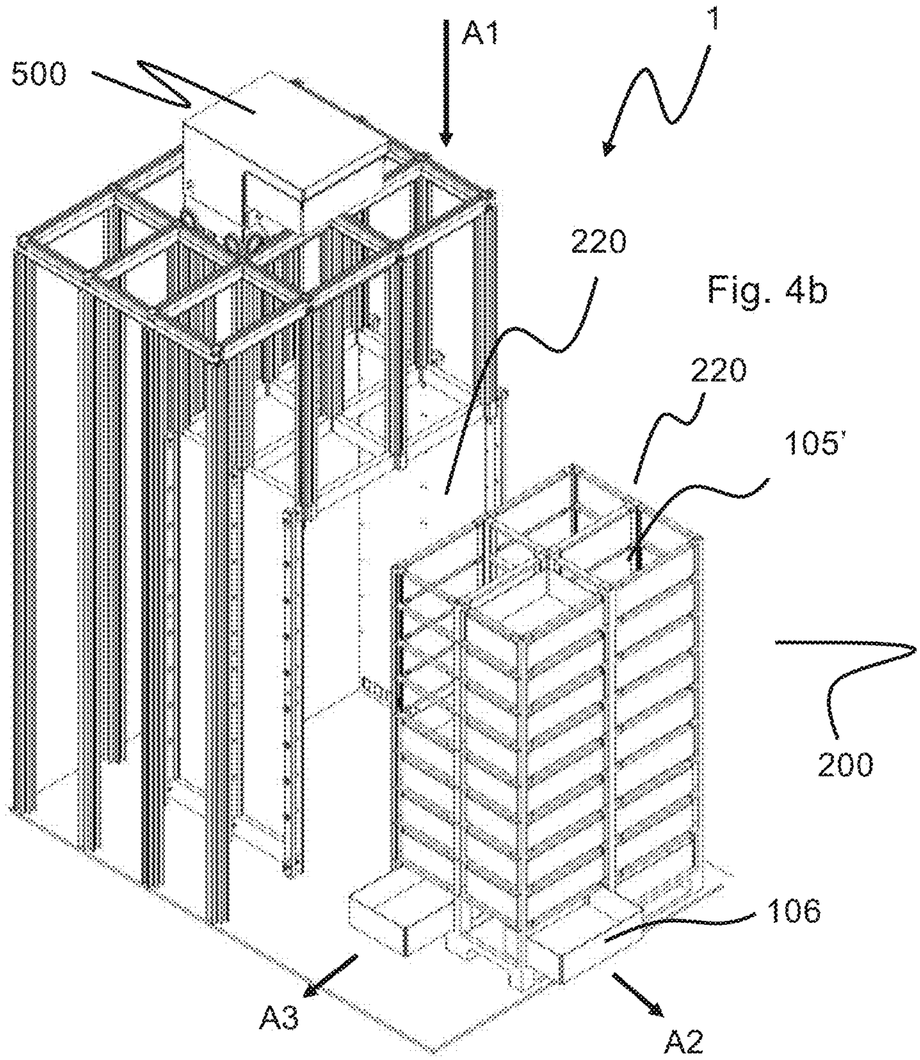
FIG. 4*b* shows another example of an automated storage and retrieval system comprising a storage column module according to another embodiment of the present invention.

FIG. 4*b* shows another example of an automated storage and retrieval system 1 comprising a storage column module 200 according to another embodiment of the present invention. The shown detachable module 200 is insertable into a free space 220 of the system 1. In one embodiment, goods holders 106, when accommodated in the module 200, and the goods holders, when accommodated in the automated storage and retrieval system 1, have the same orientation. Furthermore, the storage cell of the module 220 and a storage cell of the automated storage and retrieval system 1 are equisized. Referring back to FIG. 4*a*, the module 200 may have the same storage depth as the framework structure 100.

Figure 5:
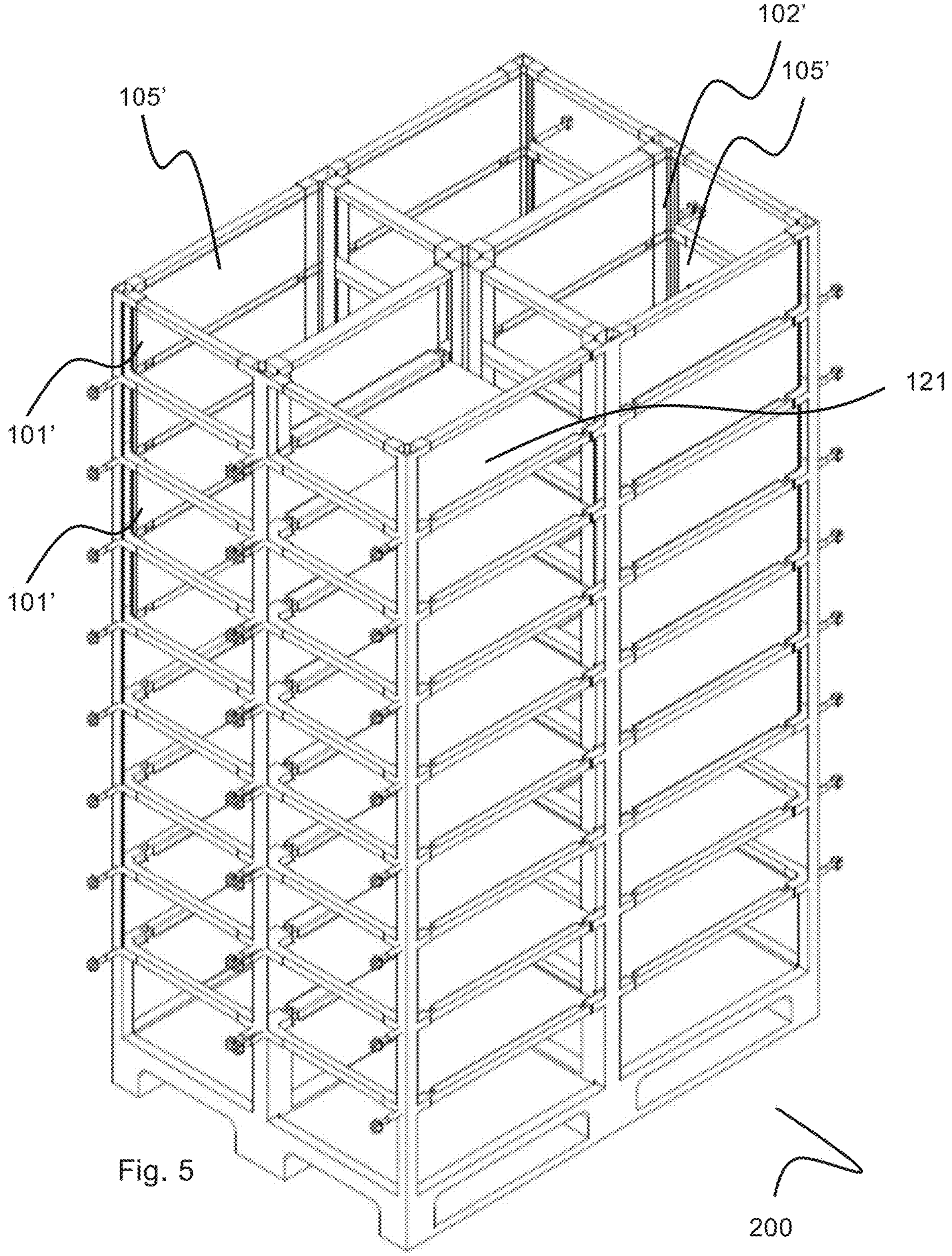
FIG. 5 is a perspective view of a storage column module according to an embodiment of the present invention.

FIG. 5 is a perspective view of a storage column module 200 according to an embodiment of the present invention. The storage column module 200 is suitable for coupling, e.g. slotting, to a framework structure 100 of an automated storage and retrieval system 1 of FIGS. 4*a*-4*b*. The module 200 comprises in total four (2×2) storage columns 105' for accommodating goods holders (not shown in FIG. 5). The goods holders are top-fed into the storage column 105' by means of a remotely operated vehicle shown in FIG. 4*b*. Arrow A1 in FIG. 4*b* denotes the direction of insertion.

With reference to FIGS. 4*a*-4*b*, said vehicle 500 operates on a rail system arranged across the top of the framework structure. Turning back to FIG. 5, each storage column 105' comprises a plurality of storage cells 101, each comprising a goods holder support 121 movable between a first position in which said support can obstruct passage of the goods holder moving vertically through the storage cell and a second position in which the vertically moving goods holder can pass through the storage cell 101. Properties of an exemplary storage cell 101 and a thereto associated goods holder support 121 will be discussed in greater detail in conjunction with FIGS. 7*a*-7*b*.

By providing a storage column module 200 having a movable goods holder support 121, it is possible to load/unload the holder in a standard manner, i.e. by means of a remotely operated vehicle positioned on top of the of the framework structure of the system. The requirement is then for the support to be in a second position, allowing the vertically moving storage container to freely traverse the empty storage cell. In a related context, the customary stacking of goods holders, i.e. superposing holders so that a given goods holder is in physical contact with both vertically adjacent holders, may be dispensed with. This is achieved when the movable goods holder support are positioned in a first position in which the support may hold and support the goods holder.

In addition and by virtue of the invention, the degree of alignment of goods holders, when positioned in the storage column, critical in the context of a conventional stack of holders, becomes irrelevant.

Turning back to FIG. 4*b*, the goods holder 106 may be extracted from the storage cell (101' shown in FIG. 5) of the at least one storage column 105' in any direction perpendicular to its direction of insertion. Arrows A2, A3 denote these directions of extraction. This confers greater flexibility as the extraction process may be performed by the operator/customer without use of a remotely operated vehicle. As shown, such a lateral extraction may take place on the short side as well as on the long side of the storage cell. This is particularly advantageous when said module is a part of a micro-fulfillment center (MFC).

In a related context, structural properties of the material of the goods holder 106 become less important. More specifically, a given goods holder 106 is in certain, well-defined applications no longer required to support the aggregated weight of the goods holders and the stored contents positioned above the given goods holder 106. Accordingly, the goods holder 106 may be made in a less expensive material and/or the quantum of material used to manufacture goods holders may be significantly reduced.

Figure 6:
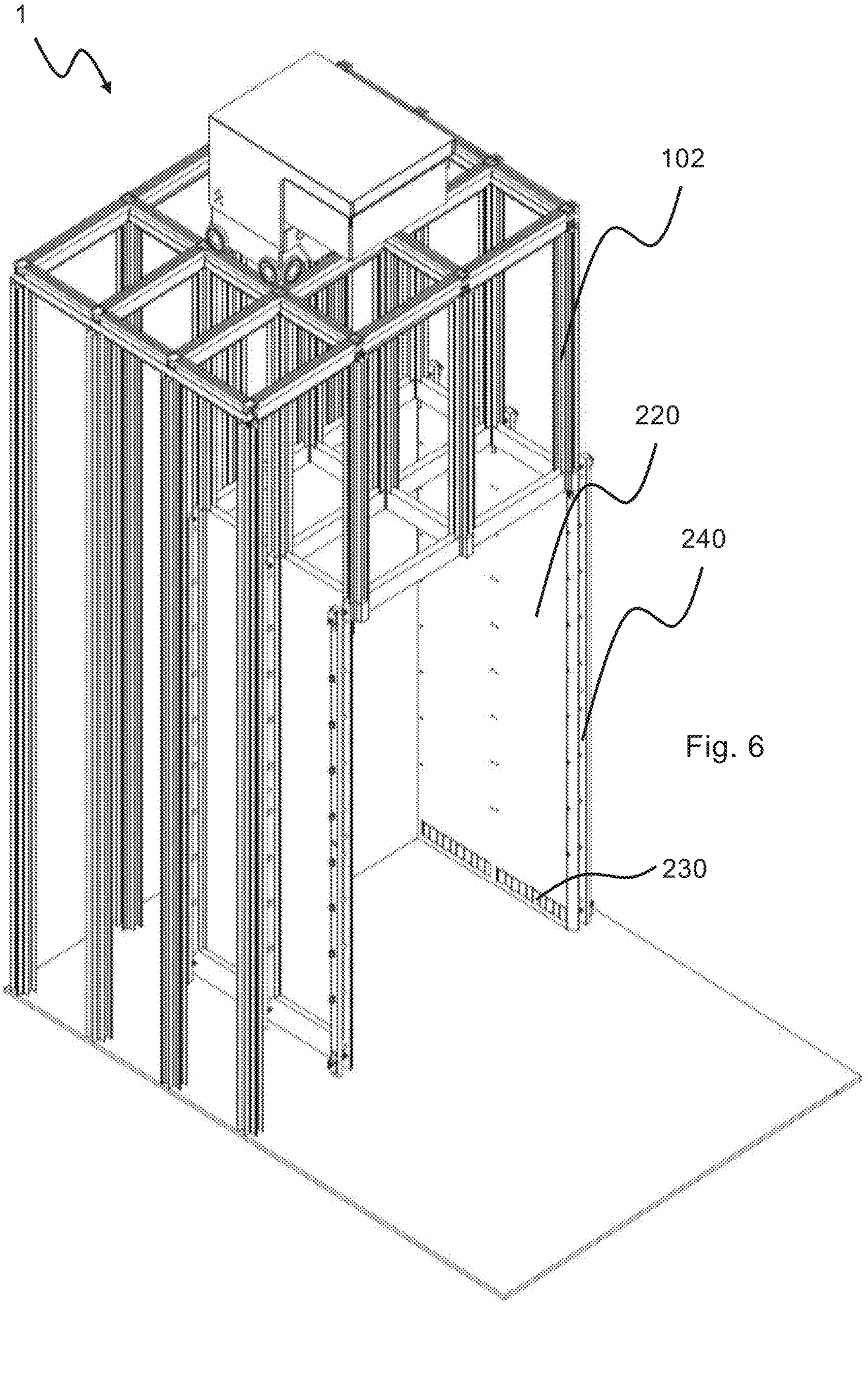
FIG. 6 shows means for guiding a storage column module according to an embodiment of the present invention.

FIG. 6 shows means for guiding a storage column module (not shown) according to an embodiment of the present invention. In the shown embodiment, the module will be guided into a correct position, i.e. the free space 220, by means of oppositely arranged sets of rollers 230. These sets of rollers are typically provided on the opposite sides and close to the bottom as well as to the top of the cover plates 240 delimiting said free space 220. In one embodiment, a single set of rollers 230 is sufficient for successfully guiding the storage column module. With reference to FIGS. 4*b* and 6, once the module is in correct position, upright members 102 of the framework structure 100 are aligned with upright members (102', shown in FIG. 5) of the framework structure of the module. Still with reference to FIGS. 4*b* and 6, the automated storage and retrieval system 1 could comprise means for locking the module in the correct position such as a releasable latch (not shown).

In an alternative embodiment (not shown), said means for guiding could comprise a complementary groove-and-projection assembly.

Figure 7A:
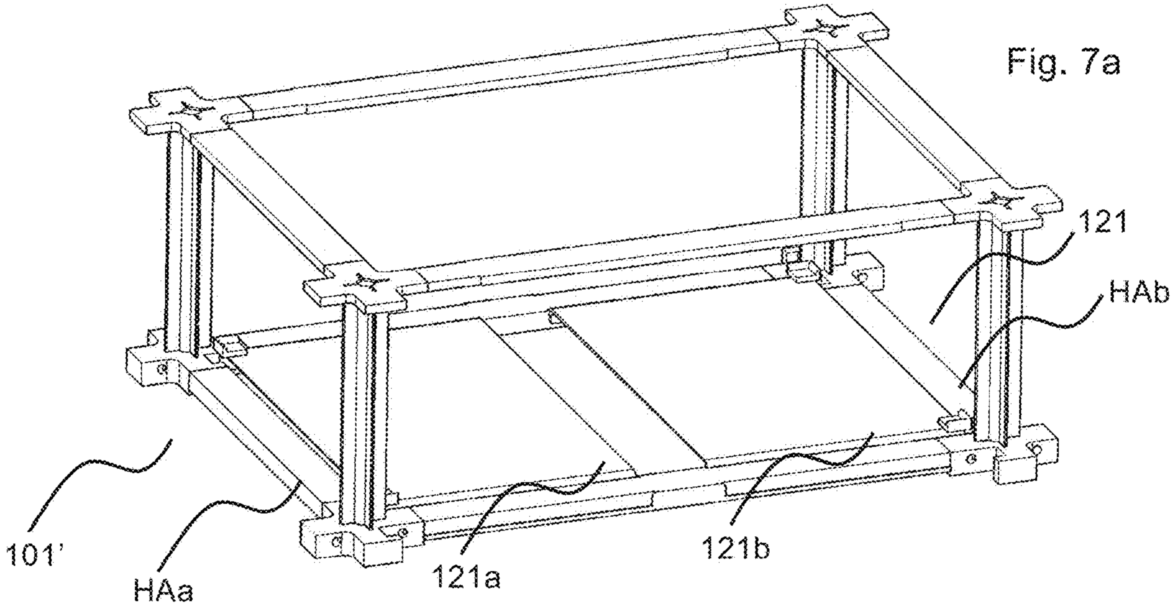
FIG. 7*a* shows a storage cell with a goods holder support according to an embodiment of the present invention.

FIG. 7*a* shows a storage cell 101' with a goods holder support 121 according to an embodiment of the present invention. The goods holder support 121 is pivotable about a horizontal axis extending between two adjacent corners of the storage cell 101. Still with reference to FIG. 7*a*, the goods holder support 121 comprises two parts 121*a*, 121*b* having parallel pivot axes HAa, HAb. The shown goods holder support 121 is in a first position, parts 121*a*, 121*b* are parallel with bottom surface of the storage cell 101', and can obstruct passage of the goods holder (not shown) moving vertically through the storage cell 101'. In a second position (not shown), parts 121*a*, 121*b* are perpendicular to the bottom surface of the storage cell 101', the vertically moving goods holder can pass through the storage cell 101'.

With additional reference to FIG. 4*b*, in a further embodiment (not shown), the goods holder is introduced into a selected storage cell of a selected storage column laterally, i.e. via the short or the long side of the storage cell. This is preceded by lowering the goods holder by means of a remotely operated vehicle into the storage column adjacent to said selected storage column. In this embodiment, it is required that the goods holder support rests in a first position and covers bottom surface of the storage cell.

The goods holder support of the above kind may be motorized, it may for instance comprise a motorized actuator, alternatively be spring-loaded or otherwise configured to reciprocate between the first and the second positions.

Figure 7B:
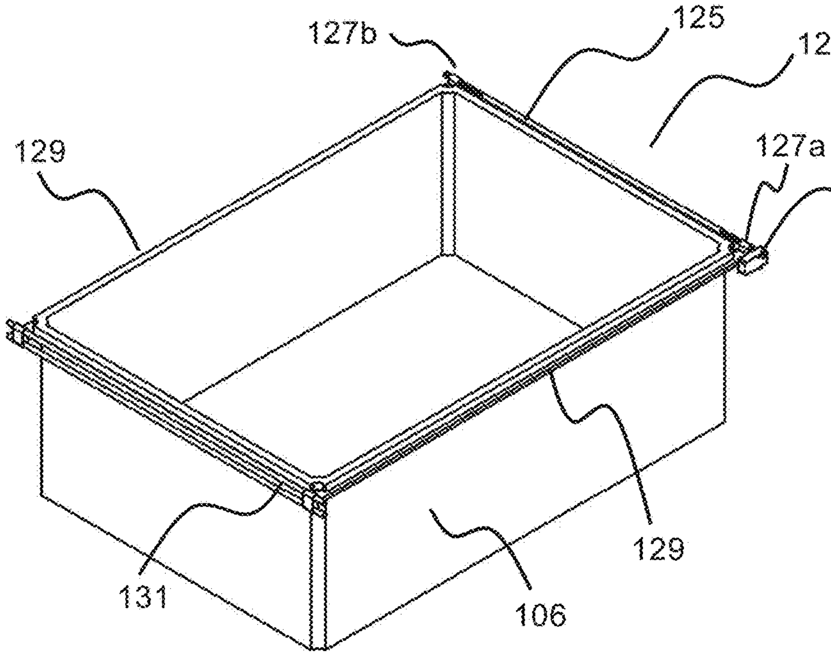
FIG. 7*b* shows a goods holder support according to another embodiment of the present invention.

Such a motorized goods holder support 121 according to another embodiment of the present invention is shown in FIG. 7*b*. In FIG. 7*b*, a motor 123 associated with the goods holder support 121 causes an elongate, cylindrically shaped, partially threaded bar 125 to axially rotate. Two internally threaded sleeves 127*a*, 127*b* are arranged on opposite ends of the bar 125. Each sleeve 127*a*, 127*b* is connected to a rod 129 arranged perpendicularly with respect to the threaded bar 125. At the other end, each rod 129 is slidably connected to another bar 131, parallel with the threaded bar 125. The sleeves 127*a*, 127*b* have different handedness—one is left-handed, the other one is right-handed. Accordingly, the distance between the sleeves 127*a*, 127*b* is variable and may be controlled through axial rotation of the bar 125. This entails that distance between rods 129 also is controllable through said axial rotation. Accordingly, the goods holder support 121 is translatory movable between a first position in which the threaded sleeves 127*a*, 127*b* are relatively close so that said support 121 can obstruct passage of the goods holder 106 moving vertically through the storage cell, and a second position where the threaded sleeves 127*a*, 127*b* are far apart and the vertically moving goods holder 106 can pass through the storage cell. In this embodiment, the goods holder 106, when in storage cell, is suspended from the rods 129 of the goods storage holder 121. In a related embodiment, the goods holder 106 may be suspended from the rods as well as from the threaded bars. In such an embodiment, the rods 129 would require driving means and threading as well dedicated sleeves analogous to those employed in connection with the threaded bar 125.

Figure 8:
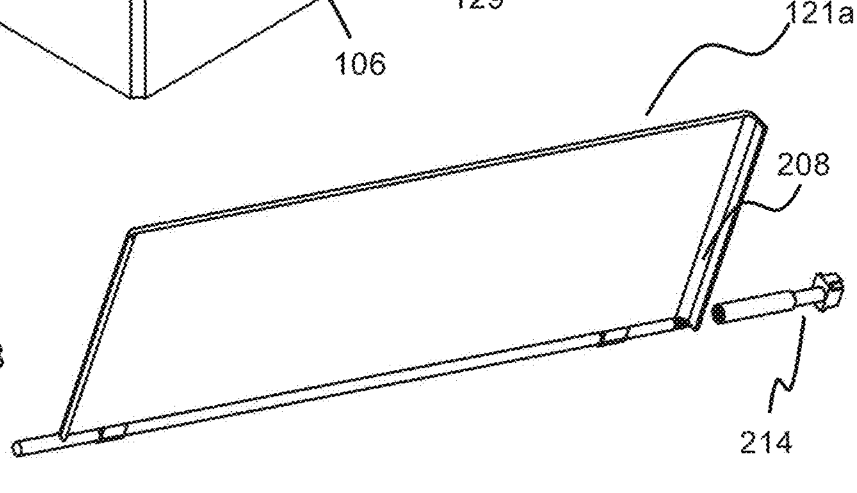
FIG. 8 is a close-up showing backside of a goods holder support according to an embodiment of the present invention.

FIG. 8 is a close-up showing backside of a goods holder support part 121*a* shown in FIG. 7*a* so that guide means 208 becomes visible. Guide means 208 in suitable material are provided to facilitate passage of the vertically moving goods holder 106 when the goods holder support is in second position. FIG. 8 further shows a device 214 for altering position of the goods holder support. This can be done individually or by means of a tool simultaneously handling a plurality of devices. Said device 214 and its function will be more discussed in conjunction with FIG. 9*c*.

FIGS. 9*a*-9*e* show a sequence featuring coupling of a detachable storage module to a framework structure of an automated storage and retrieval system as well as pivoting motion of a goods holder support.

Figure 9A:
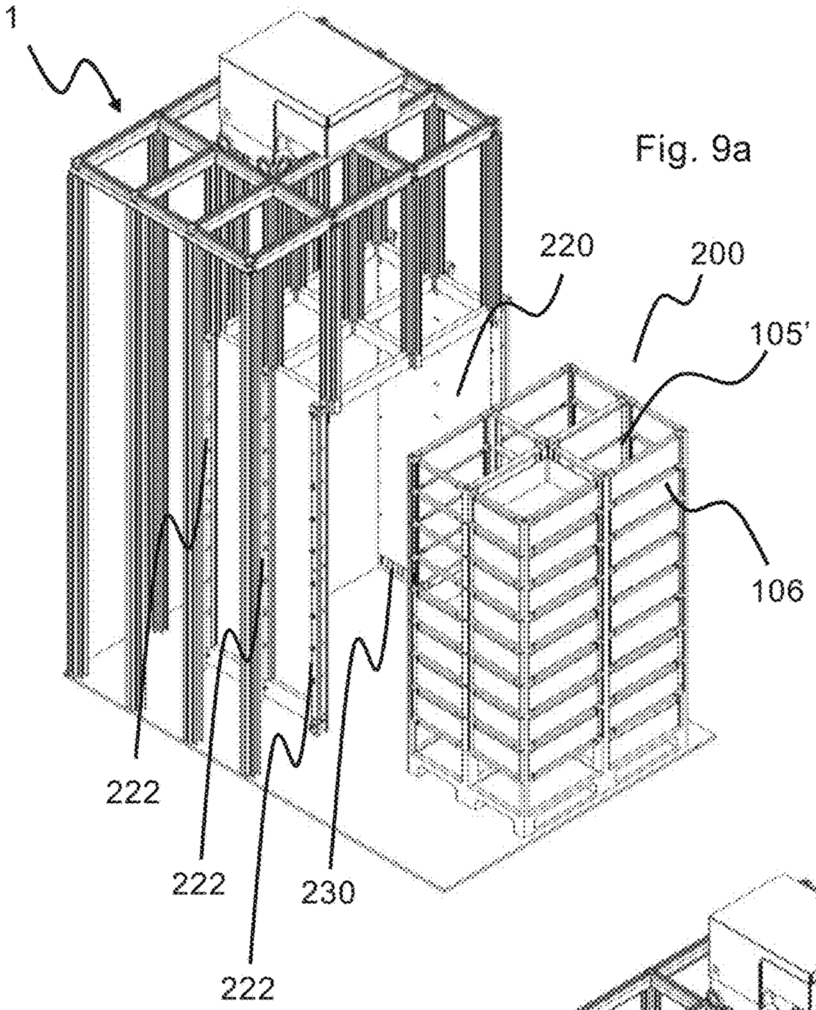

In FIG. 9*a*, the detachable module 200 is shown at a distance relative the system 1 shown in FIG. 4*b*. Shown module 200 comprises four (2×2) storage columns 105' for accommodating goods holders 106. The module 200 is here approximately aligned with the free space 220 and a set of rollers 230 discussed in conjunction with FIG. 6 will facilitate the coupling process.

Figure 9B:
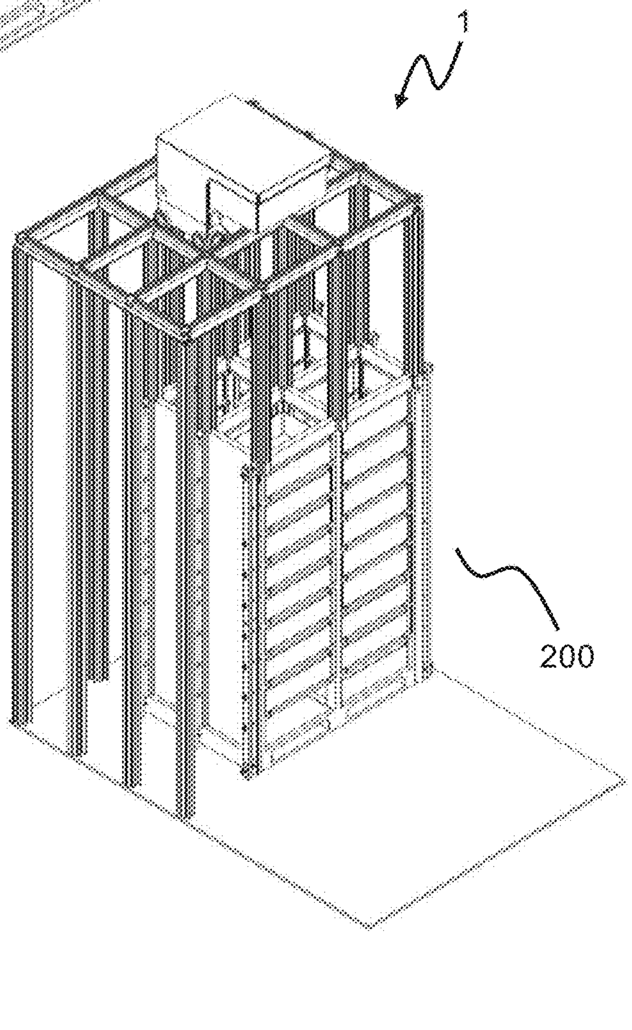

In FIG. 9*b*, the module 200 is introduced into the free space. By way of example, this may be effected by means of a forklift (not shown). As an alternative, the module may be provided with wheels so as to enable manual handling.

A unit for controlling the position of the goods holder support of the storage cell is shown in FIGS. 9*a*-9*b*. Said unit is part of the system 1 and comprises three pairs of vertically extending, oppositely arranged bars 222 arranged at a distance from one another. Each bar 222 comprises an array of devices for altering position of the thereto associated goods holder support. These devices will be discussed in greater detail in conjunction with FIG. 9*c*. In an alternative embodiment (not shown), the position of the goods holder support of the storage cell is controlled by the storage column module.

Figure 9C:
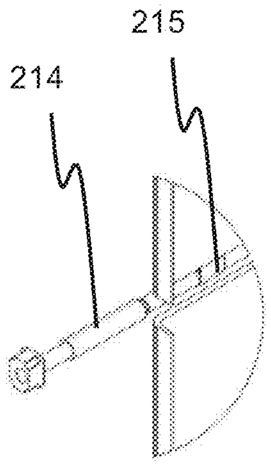
Figure 9C:
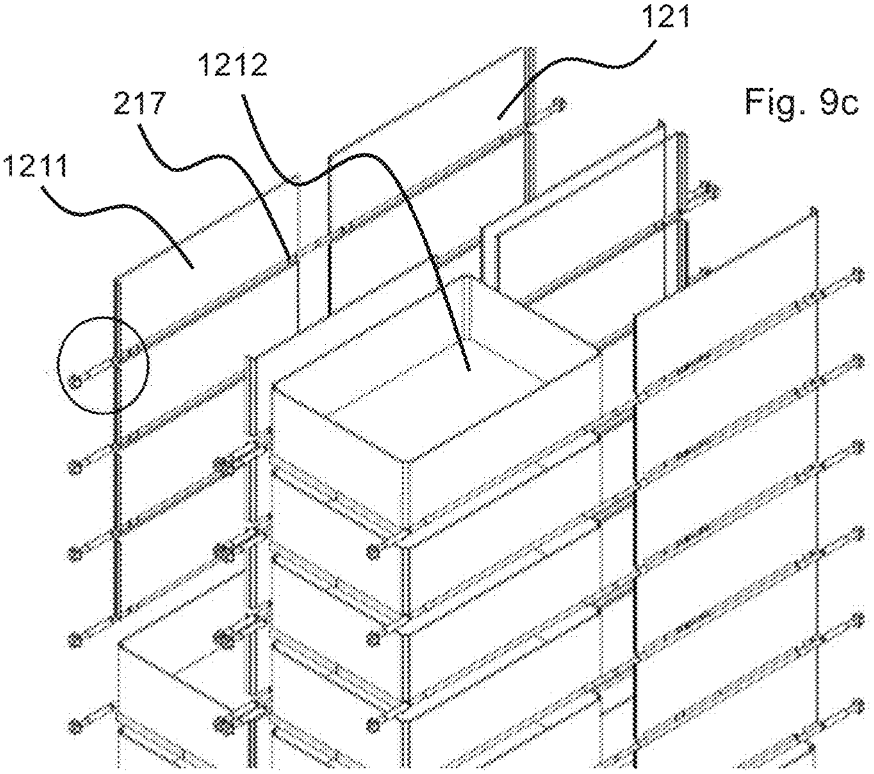

FIG. 9*c* is a close-up showing uppermost levels of the storage module whereas FIG. 9*ca* is an enlarged view of the encircled detail of FIG. 9*c*. For each storage cell 101, a device 214 for altering position of the goods holder support is engaged with a rotatable axis 217 on which the goods holder support 121 is hinged (hinge 215 is visible in FIG. 9*ca*). Rotation of said rotatable axis 217 brings about previously discussed pivot movement of the goods holder support 121. Rotation of said rotatable axis 217 is caused by turning of the device 214, either manually or by means of a suitable tool.

The goods holder supports 121 of FIG. 9*c* are in both first and second positions. By way of example and with reference to the uppermost storage cell to the left in FIG. 9*c*, the goods holder support 1211 is in second position in which said support doesn't obstruct passage of the goods holder (not shown) moving vertically through the storage cell, whereas a neighbouring goods holder support 1212 is in first position and supports the shown goods holder.

Figure 9D:
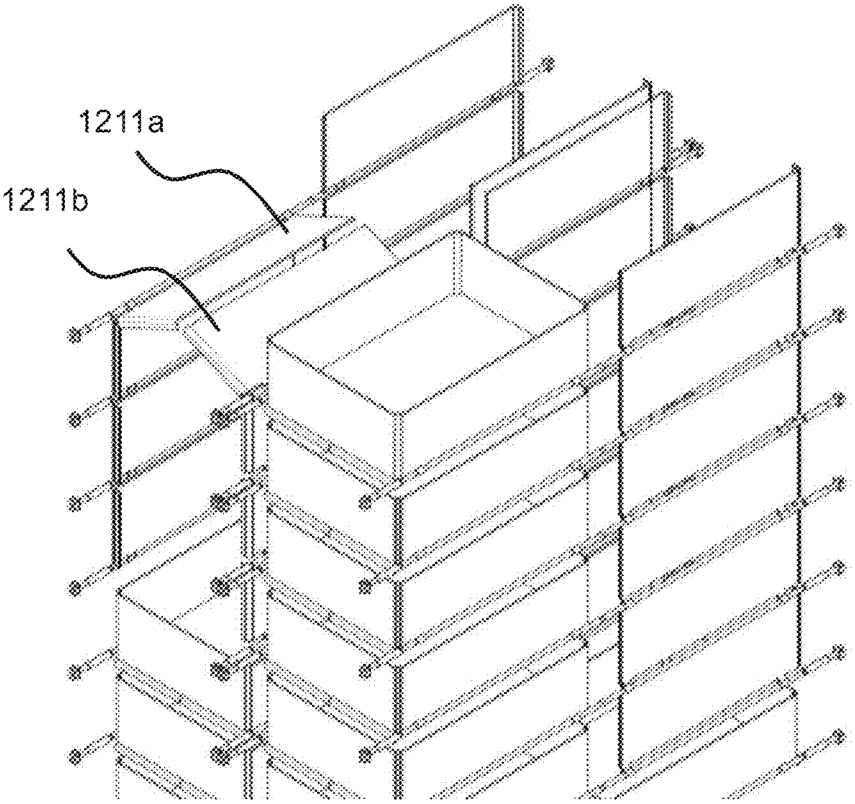

As seen in FIG. 9*d*, the two parts 1211*a*, 1211*b* making up the goods holder support 1211 are in an intermediate position between first and second position. As discussed above, pivoting of the parts 1211*a*, 1211*b* of the goods holder support 1211 is actuated by means of a device (214, visible in FIG. 9*ca*) for altering position of the goods holder support.

In FIG. 9*c*, the pivoting motion of the parts 1211*a*, 1211*b* of FIG. 9*d* caused by the device 214 of FIG. 9*ca* is completed and the goods holder support is in first position. Furthermore, a goods holder 106 inserted by means of a remotely operated vehicle shown in FIGS. 9*a*-9*b* is supported by the goods holder support.

Figure 10:
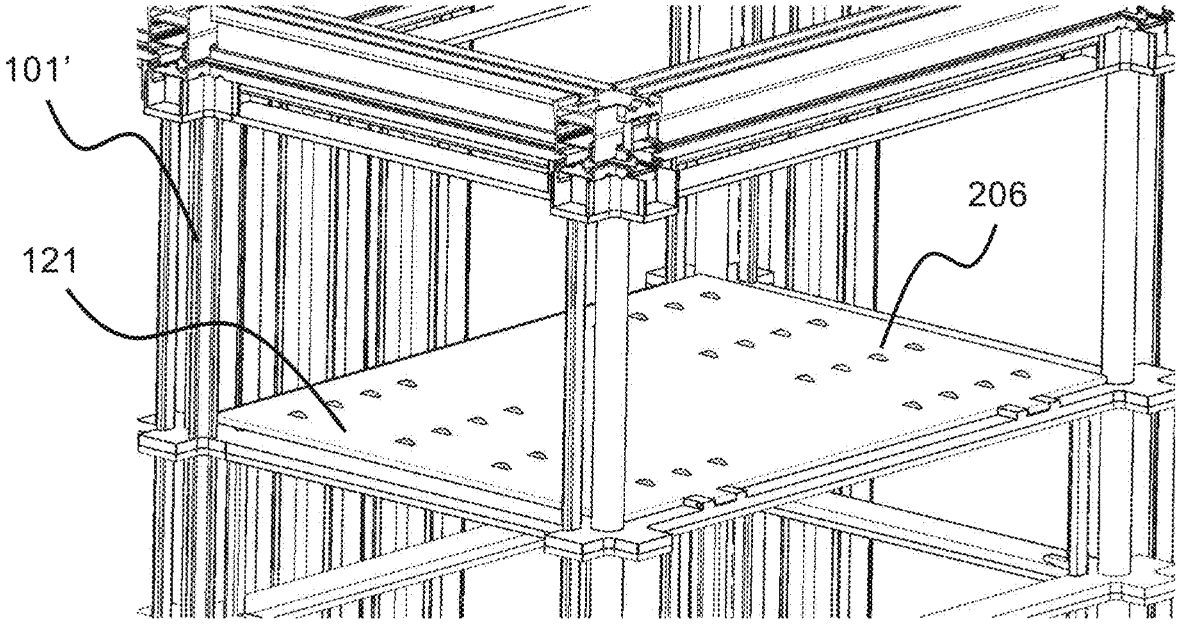
FIG. 10 shows a goods holder support comprising friction reducing means.

FIG. 10 shows a storage cell 101' with a goods holder support 121 comprising friction reducing means 206. In order to reduce friction and improve guiding of the vertically moving goods holder (not shown), friction reducing means in the form of rollers 206 may be provided. In certain embodiments, the rollers 206 are only arranged on a side of the support 121 that faces the goods holder when said goods holder passes through the storage cell.

Figure 11:
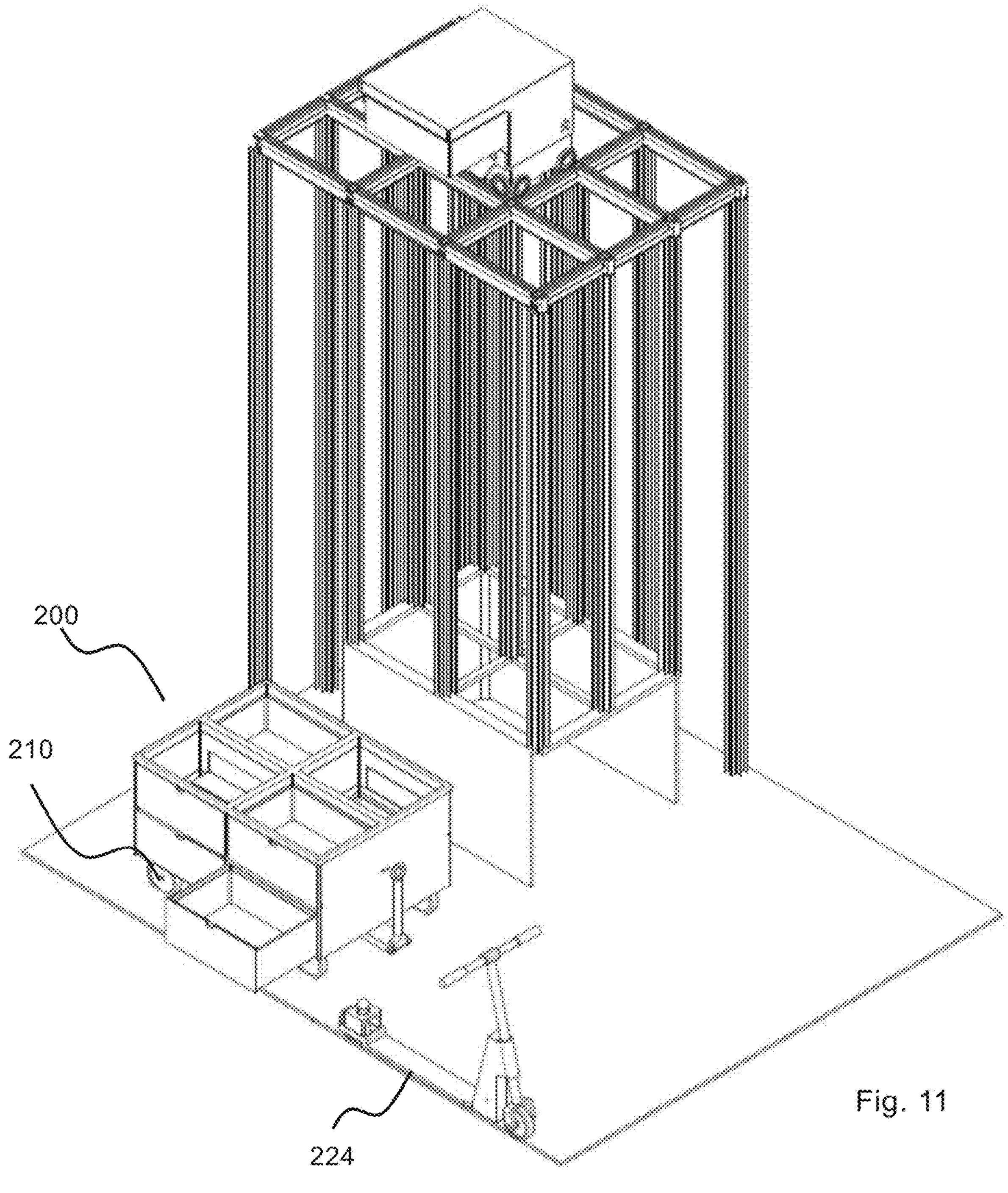
FIG. 11 shows a storage column module provided with wheels and configured to be towed.

FIG. 11 shows a storage column module 200 provided with wheels 210 and configured to be towed, for example by an operator using shown vehicle 224. A skilled operator is well-acquainted with ways to correctly couple the wheeled module 200 with the towing vehicle 224. In a related embodiment (not shown), said module may be configured for transport by means of a transport vehicle, such as a lorry. More specifically, this could entail a module of certain size and shape so as to be able to fit said module on the open trailer associated with the lorry.

FIG. 12 shows a self-propelled storage column module 200 according to an embodiment of the present invention. The module 200 is shown prior to wheeled base 200*a* being firmly connected with a storage part 200*b*. The shown wheeled base 200*a* of the storage column module 200 comprises drive means (not visible) configured to drive the module in the first and the second directions. The drive means may comprise a first set of wheels and a second set of wheels which enable lateral movement of the module in the first direction and in the second direction, respectively. The drive means may further comprise one or several motors configured to provide torque to at least one wheel to cause movement of the storage column module in the first direction and/or the second direction. The motor may be engaged with one or several wheels by means of belts(s), chain(s) and/or shaft(s). Alternatively, the motor may be a hub motor, such as an outer rotor motor arranged within a wheel. The drive means may comprise a power source configured to operate the one or several motors. The power source is typically a battery. Alternatively, power may be provided to the drive means from an external source. The storage column module 200 may be provided with sensors, cameras and/or radar units and suitable control systems in order to increase the module's degree of autonomy and reduce the need for human input when the module is moving and in particular when said module is being coupled to the framework structure of an automated storage and retrieval system.

In the preceding description, various aspects of the storage column module and the automated storage and retrieval system according to the invention have been described with reference to the illustrative embodiments. For purposes of explanation, specific numbers, systems and configurations were set forth in order to provide a thorough understanding of the system and its workings. However, this description is not intended to be construed in a limiting sense. Various modifications and variations of the illustrative embodiments, as well as other embodiments of the system, which are apparent to persons skilled in the art to which the disclosed subject matter pertains, are deemed to lie within the scope of the present invention.

LIST OF REFERENCE NUMBERS

1 Storage and retrieval system
100 Framework structure
101 Storage cell
101' Storage cell of the storage column module
102 Upright members of framework structure
102' Upright members of the framework structure of the module
104 Storage grid
105 Storage column
105' Storage column of the storage column module
106 Storage container/Goods holder
107 Stack of storage containers
110 Parallel rails in first direction (X)
111 Parallel rails in second direction (Y)
112 Access opening
119 First port column
121 Goods holder support
121*a*, 121*b* Goods holder support parts
123 Motor
125 Bar
127*a*, 127*b* Threaded sleeves
129 Rod
131 Another bar
200 Storage column module
200*a* Wheeled base
200*b* Storage part
201 Container handling vehicle belonging to prior art
201*a* Vehicle body of the container handling vehicle 201
201*b* Drive means/wheel arrangement, first direction (X)
201*c* Drive means/wheel arrangement, second direction (Y)
206 Friction reducing means
208 Guide means
210 Wheels of the storage column module
214 Device for altering position of the goods holder support
215 Hinge
217 Rotatable axis
220 Free space
230 Means for guiding the module, set of rollers
301 Cantilever-based container handling vehicle belonging to prior art
301*a* Vehicle body of the container handling vehicle 301
301*b* Drive means in first direction (X)
301*c* Drive means in second direction (Y)
401 Container handling vehicle belonging to prior art
401*a* Vehicle body of the container handling vehicle 401
401*b* Drive means in first direction (X)
401*c* Drive means in second direction (Y)

1211 Goods holder support of FIG. 9*c*
1212 Neighbouring goods holder support of FIG. 9*c*
1211*a* Part of goods holder support 1211
1211*b* Part of goods holder support 1211
X First direction
Y Second direction
Z Third direction
A1 Denotes direction of insertion of goods holders
A2, A3 Denotes direction of extraction of goods holders
HA Horizontal axis
HAa, HAb Parallel pivot axes

The invention claimed is:

1. An automated storage and retrieval system comprising a framework structure that comprises a plurality of storage columns for accommodating a plurality of goods holders, wherein a rail system is arranged across a top of the framework structure, the automated storage and retrieval system further comprising a detachable storage column module for coupling to the framework structure of the automated storage and retrieval system, said module comprising at least one storage column for accommodating the goods holders inserted by means of a remotely operated vehicle operating on the rail system, the at least one storage column comprising a plurality of storage cells each comprising a goods holder support movable between a first position in which each goods holder support can obstruct passage of a goods holder of the plurality of goods holders moving vertically through a storage cell of the plurality of storage cells and a second position in which vertically moving goods holder can pass through the storage cell.

2. The automated storage and retrieval system according to claim 1, further comprising means for guiding the module into a correct position, when the detachable module is inserted into a free space of the automated storage and retrieval system, wherein the correct position is reached when upright members of the framework structure are aligned with upright members of the framework structure of the module received in said free space.

3. The automated storage and retrieval system according to claim 1, further comprising means for locking the module in a correct position.

4. The automated storage and retrieval system according to claim 3, wherein said means for locking comprises a releasable latch.

5. The automated storage and retrieval system according to claim 1, wherein the goods holders accommodated in the module and the goods holders transported within the automated storage and retrieval system have the same orientation.

6. The automated storage and retrieval system according to claim 1, wherein the storage cell of the module and a portion of free space of the automated storage and retrieval system are equisized.

7. The automated storage and retrieval system according to claim 1, wherein each goods holder support is pivotable about a horizontal axis.

8. The automated storage and retrieval system according to claim 7, wherein the horizontal axis extends between two adjacent corners of the storage cell.

9. The automated storage and retrieval system according to claim 1, wherein each goods holder support comprises two parts having parallel pivot axes.

10. The automated storage and retrieval system according to claim 1, wherein each goods holder support is translationally movable between a first position in which each goods holder support can obstruct passage of the goods holder moving vertically through the storage cell and a second position in which the vertically moving goods holder can pass through the storage cell.

11. The automated storage and retrieval system according to claim 1, wherein each goods holder support comprises friction reducing means in the form of rollers arranged in each goods holder support.

12. The automated storage and retrieval system according to claim 1, wherein each goods holder support comprises guide means arranged on a side of each goods holder support that faces the vertically moving goods holder when said goods holder passes through the storage cell.

13. The automated storage and retrieval system according to claim 1, further comprising a unit for controlling the position of each goods holder support of the storage cell.

14. The automated storage and retrieval system according to claim 1, wherein the position of each goods holder support of the storage cell is controlled by the storage column module.

15. The automated storage and retrieval system according to claim 1, wherein said module has a storage depth equal to a storage depth of the framework structure.

16. The automated storage and retrieval system according to claim 1, said module comprising a rail system arranged across the top of the module.

17. The automated storage and retrieval system according to claim 1, said module comprising two rows of storage columns.

18. The automated storage and retrieval system according to claim 1, wherein said module is configured for transport by means of a transport vehicle comprising a lorry.

19. The automated storage and retrieval system according to claim 1, wherein said module is self-propelled.

20. The automated storage and retrieval system according to claim 1, wherein said module is provided with wheels and configured to be towed.

* * * * *